Patented Feb. 1, 1944

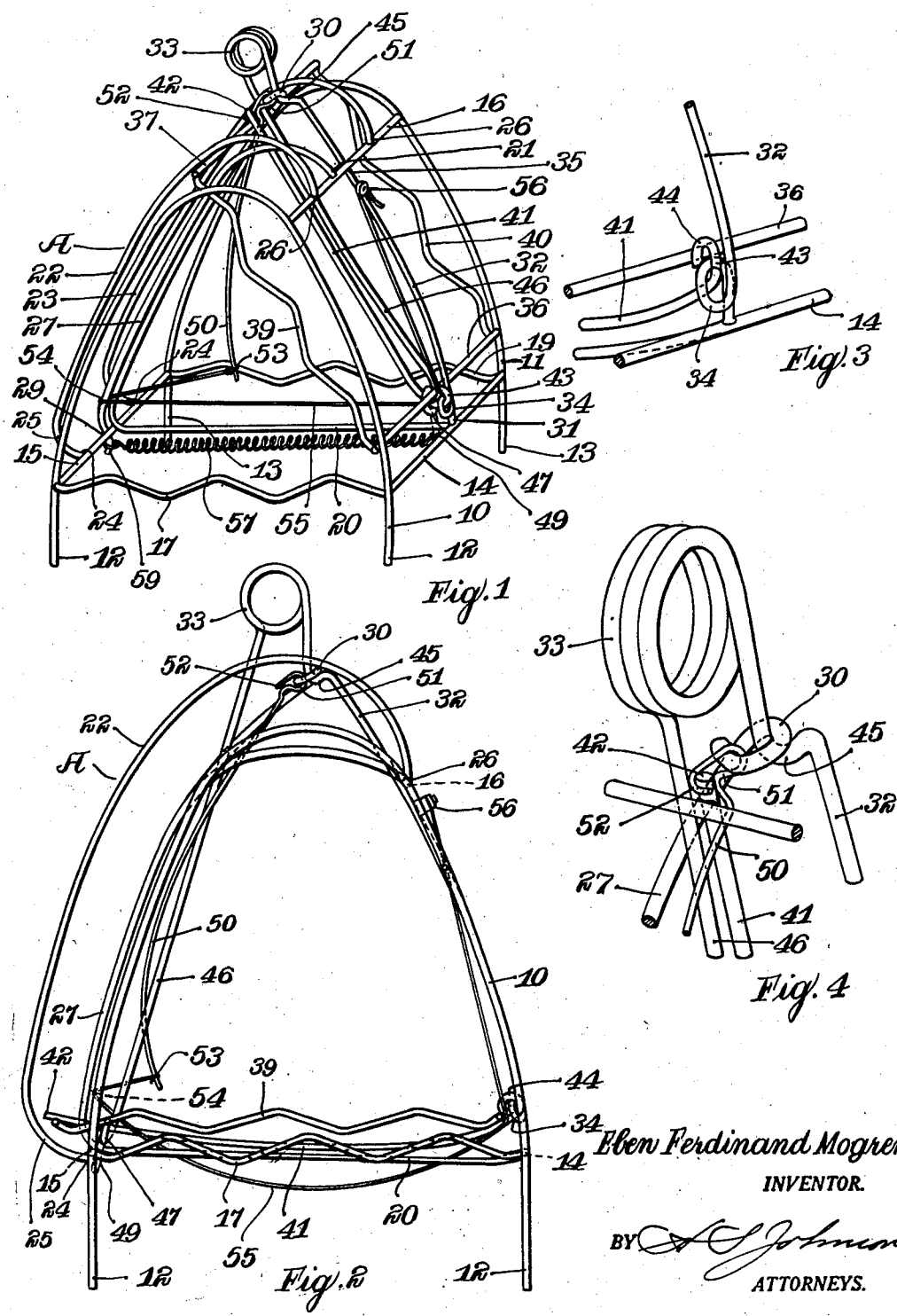

2,340,484

UNITED STATES PATENT OFFICE 2,340,484

TRAP

Eben Ferdinand Mogren, Weaver, Minn.

Application April 25, 1941, Serial No. 390,267

4 Claims. (Cl. 43—85)

My invention relates to an improvement in traps wherein it is desired to provide a simple and effective trap for catching animals of any size.

I have found that with many types of traps commercially used the animals caught are injured to a considerable extent by the trap, thereby injuring the fur to some extent. In trapping small animals for profit it is, of course, extremely desirable to catch the animal without injuring the skin any more than is necessary. Thus, when the skin has been removed it is in good shape and will command a higher price than skins which have been damaged.

It is an object of the present invention to provide a trap, preferably of the type which is placed in the animal runway and through which the animals are designed to pass. This trap is open at both ends and the animal passes through the trap from one end to the other. However, during movement of the animal from one end to the other of the trap a trigger is released trapping the animal within the trap.

It is a feature of the present invention to provide a trap having a bottom in the form of spaced rods or supports, and to place a pivotal element in the form of a rack of spaced rods, or the like, into pivotal attachment with the bottom of the trap. This rack is normally pivoted away from the bottom of the trap, except at one edge of the rack and is held in elevated position by a suitable trigger means. When this trigger is released the rack pivots down under spring tension into substantially parallel relation with the bottom of the trap, thus trapping the animal between the rack and the bottom of the trap.

It is a feature of my invention to provide a trap, preferably formed of wire or wire rods, so as to make the construction light weight and easily disguised. This wire, or series of wire rods is formed into a frame work for supporting the trap bottom and the pivoted rack and permits light to enter through the walls of the trap so that the animal need not travel through a dark passage or tunnel. In this way the trap will not frighten the animals and they will pass through the same readily without fear of injury.

It is a purpose of the present invention to provide a trap comprising a bottom and a series of spaced loops extending upwardly from said bottom to form a passage through which the animal must pass. The trigger for releasing the pivoted rack depends within this passage so that the end of the trigger will engage the side of the animal passing through the trap. As the side of the animal engages the trigger and presses it, the trigger toward the side of the trap during the passage of the animal through the same, the trigger is released and the pivoted rack pivots down upon the animal body, flattening the animal against the bottom of the trap. With this construction the pelt of the animal is not injured but the animal is held securely from movement.

It is a feature of my invention that the trap is provided with feet or legs which engage into the ground to anchor the trap firmly in place. Thus the trap may be held in the runway of the animals and will not be permitted to move out of position. If the trap is to be used for animals which might be found in a house, such as rats or mice, these legs may be cut off so that the bottom of the trap may rest upon the floor.

These and other objects and novel features of my invention will be more clearly and fully set forth in the following specification and claims.

In the drawing forming a part of my specification:

Figure 1 is a perspective view of my trap in readiness for operation.

Figure 2 is an end view of my trap after the same has been sprung.

Figure 3 is a perspective view of the hinge bottom, the pivoted rack, and the base of the trap.

Figure 4 is a perspective view of the manner in which the trigger is secured to the pivoted rack.

My trap A comprises a pair of spaced parallel arches 10 and 11 having the closed end of the wire arch uppermost and the lower free ends of the arch, indicated in the drawings by the numerals 12 and 13, projecting downwardly to anchor the trap into the ground. Spaced above the extremities of the ends 12 and 13 of the arches 10 and 11 I provide longitudinally extending connecting bars 14 and 15. A third connecting bar 16 connects the arches 10 and 11 on one side of the center of the top of the arch, as illustrated in Figure 1 of the drawing.

The free ends 12 of the arch 10 are connected at a point spaced above the extremities thereof by a rod 17. This rod 17 may be of irregular formation, as illustrated in the drawing, or may be substantially straight if it is preferred. It is felt that the zigzag construction illustrated will hold the animal more firmly than will a straight rod. Spaced from the extremities of the ends 13 of the arch 11 I secure a connecting rod 19 in opposed relation to the rod 17. The rod 19 may be zigzag in formation similar to the rod 17. The series of rods are secured together by any suitable means, such as welding or the like.

Intermediate the rods 17 and 19 I provide a reinforcing bar 20 which is secured at one extreme end to the bar 14 and which is welded to the bar 15. The bar 20 continues upwardly on approximately the same line of arcuation as the arches 10 and 11 and is terminally secured at 21 to the longitudinally extending reinforcing bar 16. In order to further support the trap and to prevent the animal from passing out through the side of the trap, a pair of spaced parallel bars or rods 22 and 23 are secured at one end 24 to the longitudinally extending connecting bar 15, arc outwardly from this bar, as shown at 25, and are terminally secured at 26 to the reinforcing bar 16. It will be noted that the bars 22 and 23 are outwardly of the arches 10 and 11, as best seen in Figure 2 of the drawing. One end of the pivoted rack extends between these rods 22 and 23 and the inner rods, such as 20.

Spaced but slightly from the rod 20 I provide a rod 27 which is connected at its lower extremity to the connecting bar 15 at 29. The upper end of the bar 27 is provided with a loop 30 which will be later described in detail.

It will be noted that the transversely extending bars or rods 17, 19, and 20 form the bottom of the trap against which the animal is to be clamped. The means for clamping the animal against the bottom will now be described. Intermediate the arches 10 and 11 and terminally connected at 31 to the longitudinally extending bar 14 I provide one end 32 of an operating spring 33. A loop 34 is provided in the spring end 32, as best illustrated in Figure 3 of the drawing. The spring end 32 is welded, or otherwise affixed, at 35 to the longitudinally extending reinforcing rod 16.

A clamping rack is provided which comprises a pair of longitudinally extending parallel end rods 36 and 37, which are connected by a pair of transverse rods 39 and 40 which are preferably zigzag in shape. Intermediate the rods 39 and 40 I provide a third rod 41 which is secured to the rod 37 and extends beyond the same to form an extending end 42. This extending end 42 of the rod 41 may best be seen in Figure 4 of the drawing. At the other end the rod 41 extends beyond the rod 36 and is made into the form of a loop 43 which extends through the loop 34. The end 44 of the rod 41 is secured to the longitudinally extending rod 36, as best illustrated in Figure 3 of the drawing. The connection between the loops 43 and 34 provides a hinge to hingedly secure the rack to the body of the trap.

The end 32 of the spring 33 is provided with a notch 45 in which the loop 30 of the rod 27 is engaged. The other end 46 of the spring 33 is provided with a loop 47 and a projecting end 49 which moves along the rod 20 of the trap bottom. The loop 47 engages around the reinforcing rod 41 of the pivoted rack. Thus, when the rack is free to pivot the spring 33 will tend to uncoil and to move the loop 47 along the rod 41 toward the end rod 37 of the pivoted rack. This act tends to clamp the rack down against the bottom of the trap. Figure 2 of the drawing shows the spring end 46 in unsprung position with the rack in clamping position, while Figure 1 of the drawing shows the rack in elevated position ready to be sprung by movement of the trigger.

The trigger comprises a wire 50 which includes a loop 51 extending through the loop 30 of the rod 27 and includes a hook end 52 designed to engage around the projecting end 42 of the rod 41 of the pivoted rack. The construction is such that the trigger arm 50 extends into the normal passageway through the trap as illustrated in Figure 1 of the drawing. As an animal moves past the trigger, the trigger is forced outwardly toward the side of the trap, this causing the trigger to pivot about the loop 51, raising the hook end 52 out of engagement with the projecting end 42 of the center rod 41 of the rack. As soon as the trigger 50 is released from the center bar of the rack, the rack is pivoted down against the base of the trap by the loop 47, squeezing the animal between the rack and the bottom of the trap.

An additional trigger or trip cord may be provided to supplement the trigger 50. The cord 55 is secured at one end 53 to the trigger 50, and passes through a hole, pulley, or loop at 54 in the rod 27. The cord 55 then continues across the lower portion of the trap above the base rods 17, 19, and 20, around the rod 36, and is terminally adjustably secured at 56 to the rod 32.

If an animal passing through the loops 10 and 11 strikes the string 55, and pulls on this string, the trigger 50 is operated even though the animal has not actually touched the trigger.

As shown in Figure 1, an additional spring 57 may, if desired, extend between the extending end 59 of the bar 27 and the projecting end 49 of the spring portion 46. This spring may increase the force with which the trap is sprung, when it is desired, or it may be removed as in Figure 2 of the drawing.

In accordance with the patent statutes, I have described the principles of construction and operation of my trap, and while I have endeavored to set forth the best embodiment thereof, I desire to have it understood that this is only illustrative of a means of carrying out my invention and that obvious changes may be made within the scope of the following claims without departing from the spirit of my invention.

I claim:

1. A trap comprising a base including spaced connected zigzag rods, an arched passageway projecting upwardly from said base, a rack including spaced zigzag rods pivotally secured to said passageway and pivotal from a position adjacent said base to a position against a wall of said arched passageway, spring means urging said rack against said base so that all of said rods extend in substantially parallel relationship, and trigger means holding said rack against said one wall of said arched passageway.

2. A trap comprising a base including spaced zigzag rods, an arched body extending upwardly from said base having a passageway therethrough, a rack including spaced zigzag rods pivotally secured to said body and base and pivotal between a position adjacent said base and an elevated position adjacent a wall of said body, spring means urging said rack against said base so that all of said rods extend in substantially parallel relationship, and trigger means holding said rack against said wall of said body.

3. A trap comprising arch means secured in spaced relation to define a passage therebetween, zigzag spaced rods supported by said arches and forming a base, a wire rack pivotally secured along one edge adjacent the juncture between said base and said arches, said rack being pivotal against said base, spring means urging said rack into clamping position with relation to said base and extending partially below said zigzag connecting means, and trigger means releasably holding said rack in elevated position.

4. A trap comprising a body having a longitudinally extending passage therethrough, a base on said body, a rack pivoted along a longitudinal axis to said body adjacent said base, said rack being pivotal from a clamping position against said base to an elevated position, a rod extending longitudinally of said rack, a spring having a looped end encircling said rod, said spring engaging said rod on said rack and tending to urge said rack into clamping position with relation to said base, and trigger means for holding said rack in elevated position.

EBEN FERDINAND MOGREN.